(12) United States Patent
Mohideen et al.

(10) Patent No.: US 8,381,976 B2
(45) Date of Patent: Feb. 26, 2013

(54) SYSTEM AND METHOD FOR OBJECT METROLOGY

(75) Inventors: Mohammed Ibrahim Mohideen, Karnataka (IN); Isaac Cohen, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/853,900

(22) Filed: Aug. 10, 2010

(65) Prior Publication Data

US 2012/0037705 A1 Feb. 16, 2012

(51) Int. Cl.
*G06K 15/00* (2006.01)

(52) U.S. Cl. .......... 235/383; 348/164; 348/49; 348/294; 382/118

(58) Field of Classification Search .................. 235/383; 348/164, 49, 294; 382/118
See application file for complete search history.

(56) References Cited

U.S. PATENT DOCUMENTS

| | | | |
|---|---|---|---|
| 7,677,451 B2* | 3/2010 | Dickover et al. .............. | 235/383 |
| 2010/0020209 A1* | 1/2010 | Kim .............................. | 348/294 |
| 2010/0128129 A1* | 5/2010 | Kim .............................. | 348/164 |
| 2010/0208039 A1* | 8/2010 | Stettner .......................... | 348/49 |
| 2011/0150300 A1* | 6/2011 | Lee et al. ....................... | 382/118 |

* cited by examiner

*Primary Examiner* — Kristy A Haupt
(74) *Attorney, Agent, or Firm* — Schwegman, Lundberg & Woessner, P.A.

(57) ABSTRACT

A system includes a time of flight (TOF) camera or similar device, a processor coupled to the TOF camera, and a sensor. The processor receives TOF data from the sensor. The TOF data is related to an object within range of the TOF device. The processor calculates dimensions of the object using the time of flight data.

17 Claims, 4 Drawing Sheets

SYSTEM AND METHOD FOR OBJECT METROLOGY

TECHNICAL FIELD

The present disclosure relates to object metrology, and in an embodiment, but not by way of limitation, to a system and method to measure object metrology using a time of flight camera.

BACKGROUND

Shipping and delivery companies handle transportation, shipping, and distribution of a large volume of goods. Efficient asset management and unambiguous billing are two important aspects for high productivity and customer satisfaction for these companies. To satisfy these aspects, companies adopt automation at several stages throughout the supply chain to stay in this highly competitive business. For example, wider application of barcode technology for asset management has yielded higher productivity for these companies. However, certain aspects of billing procedures still require human intervention, such as the measurement of the size of consignment goods. Current generation image-based Automatic Identification and Data Capture (AIDC) devices don't support the measurement of such goods. A non-contact, automated measurement of size of goods and other objects would achieve higher productivity, unambiguous billing, and increased customer satisfaction.

Similarly, in the automotive and other manufacturing industries, dimensional error margins during the assembly process result in reduced product quality and, subsequently, lengthy corrective actions. To avoid this, accurate and efficient metrology solutions on components and assembly geometry are needed.

Today, the object metrology task required for asset management in the above-identified markets such as shipping and manufacturing are performed with a large amount of human effort, or simply estimated by an operator, and this leads to loss of revenue, poor productivity, ambiguous billing, and poor customer satisfaction.

DETAILED DESCRIPTION

Time-of-flight (TOF) cameras and devices are specialized active camera sensors that determine both range and intensity at each pixel of the field of view by measuring the time taken by light to travel to an object in the field of view and back to the camera. In a typical TOF camera, a wide light stripe is beamed onto the surface of the object under measurement. The camera captures the projected light stripe and converts it into thousands of 3-D measurement points using triangulation and digital imaging. Typical spatial resolutions of such cameras are 64×16, 160×120, 176×144, 200×200 pixels, and other spatial resolutions, with variable frame rates up to 100 frames per second (fps).

In an embodiment, a TOF camera is used to determine the dimensions of an object. A processor within the TOF camera executes general image processing procedures such as noise filtering, view normalization, corner detection, and object segmentation on the captured 3D data. The data can be customized to suit a 3D image. For example, one of several image segmentation algorithms such as region growing that is available for a 2D image can be modified to be used for segmenting objects from 3D data. The object under observation can be segmented from the background by exploiting each pixel's 2D connectivity with the neighboring pixels together with the pixel's corresponding position in 3D space. The direct distance measurement from the 3D TOF camera, when adopted in handheld automatic imaging and data capture (AIDC) devices, can assist in improving productivity, billing, and customer satisfaction, leading to efficient supply chain management. At the billing end, such metrology information can assist in deciding an accurate fare. At the delivery end, the metrology information can be used as proof of delivery and correct consignment to the customer.

In an embodiment, the time of flight is used for automatically correcting the orientation of a surface containing a barcode for an improved accuracy in decoding the content of the barcode. The TOF camera provides an accurate measurement for 3D geometry of the surface of the object. The 3D surface description is used for normalizing the geometry of the underlying surface (e.g., curved objects and tilted surfaces) by compensating for the distortion of the barcode due to the geometry of the surface on which the barcode is printed.

Figure 1:
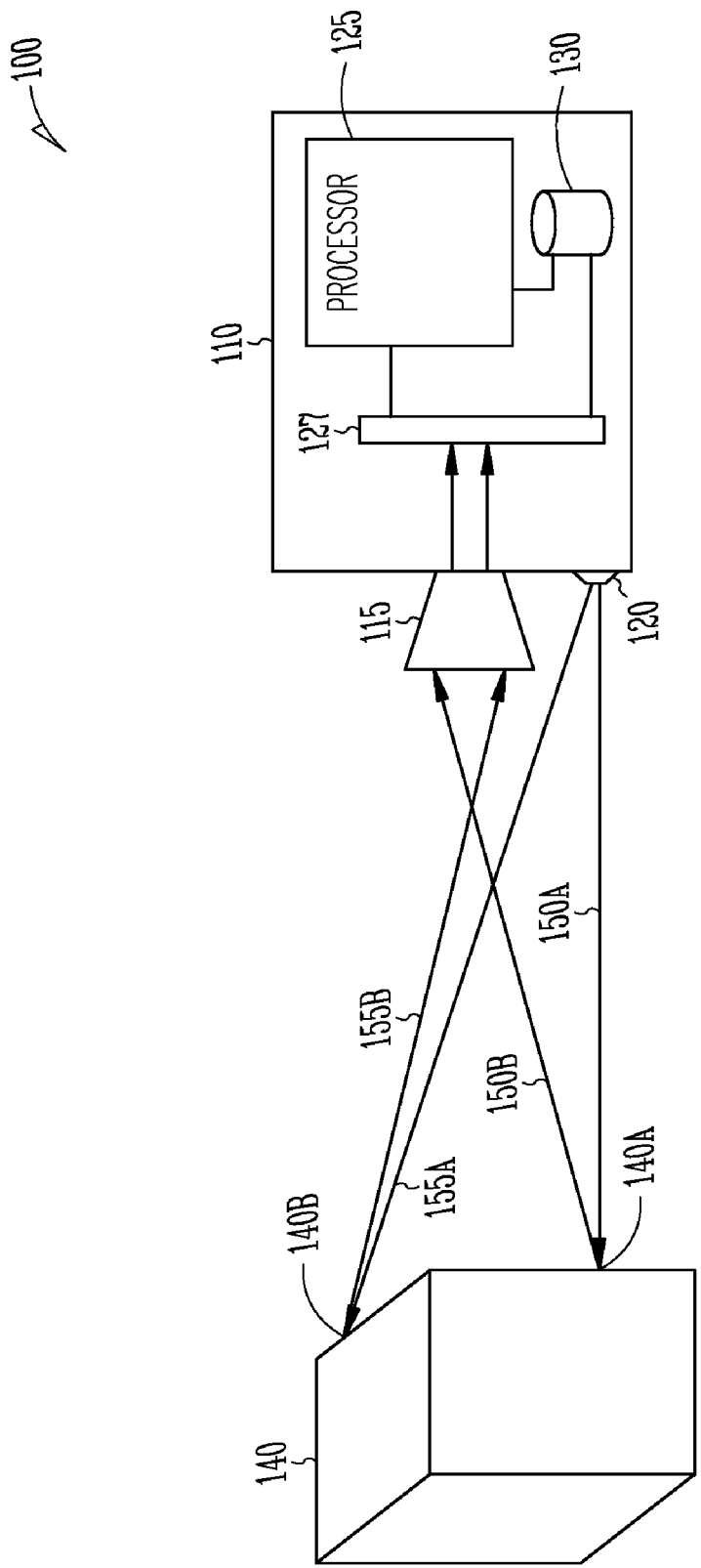
FIG. 1 is a block diagram of an example embodiment of a system to determine object metrology using a time of flight (TOF) camera.

FIG. 1 illustrates a system 100 that includes a time of flight (TOF) sensor-based 3D imager or camera 110. The TOF camera 110 includes an ordinary optical lens 115, and further can include a processor 125 and storage medium 130. The TOF camera 110 further includes a modulated light source 120 such as a laser or light emitting diode (LED) in addition to a pixel array 127. The modulated light source 120 can transmit pulses of light towards an object 140. The light pulses reach the object 140, are reflected back to the TOF camera 110, are received via the lens 115, and impinge upon the pixel array 127. The time that it takes a light pulse to travel from the light source 120 to the object 140 and back to the camera 110 and pixel array 127 can be determined by the processor 125. Also, in an embodiment, the pixel array 127 and processor 125 are capable of determining the phase, intensity, and color characteristics of the incoming light. Any data or results of calculations by the processor 125 can be stored in storage medium 130.

The processor 125 can be implemented in a single chip using an ordinary complementary metal oxide semiconductor (CMOS) process. The object of interest 140 is illuminated by short light pulses 150A, 155A, and the camera 110 measures the time taken until the reflected light 150B, 155B returns to the camera 110 and impinges on the pixel array 127. This time is directly proportional to the distance between the camera 110 and the object 140, and in particular, to different portions of the object such as 140A, which as illustrated in FIG. 1, is closer to the camera, and 140B, which as illustrated in FIG. 1, is farther away from the camera. In this manner, the camera 110 can provide a distance range value for each pixel on the pixel array 127. Larger time of travel values indicate greater distances from the camera for different portions of the object. These pixel distance differences can then be used to determine the dimensions of the object.

The principle is similar to that of 3D scanners. However, with a 3D scanner, the object must be scanned in an x-y plane. In contrast, the TOF camera 110 captures an entire scene at a single instant in time. As noted, in an embodiment, intensity, color, and data are captured along with the depth (time of flight) data. The entirety or a portion of this data is subjected to one or more of several image processing techniques known in the art. The output from this processing, whether it is from a purely depth analysis, or it is from a depth analysis coupled with intensity, color, and phase data and known video processing techniques, will result in the measurement of length, width, size, volume, and other physical characteristics of the object 140.

The 3D TOF camera 110 can be designed and manufactured to be very compact due to the fact that the illumination light source 120 can be placed close to the lens 115 of the TOF camera 110. The distance information extraction, as explained above, is a relatively straightforward procedure requiring minimal processing power. Further, fast TOF cameras capable of capturing and processing at rates of around 100 frames per second can be employed for real-time applications.

The metrology of an object can be addressed with extraction of a three dimensional (3D) point cloud of the object 140 under observation. This 3D point cloud can be generated with the time of flight (TOF) camera 110 and the computer processor 125. In an embodiment, the object metrology system 100 can be embodied in a hand held device, which can easily be used to determine the size and volume of an object in the shipping industry, or to determine the compliance with the specifications of a manufactured good on an assembly line, just to list two examples. Such a hand held device could even be coupled with a hand held scanner of bar codes, and the additional data from the object metrology unit could be encoded along with other product information in a barcode leading to efficient supply chain management.

Figure 2:
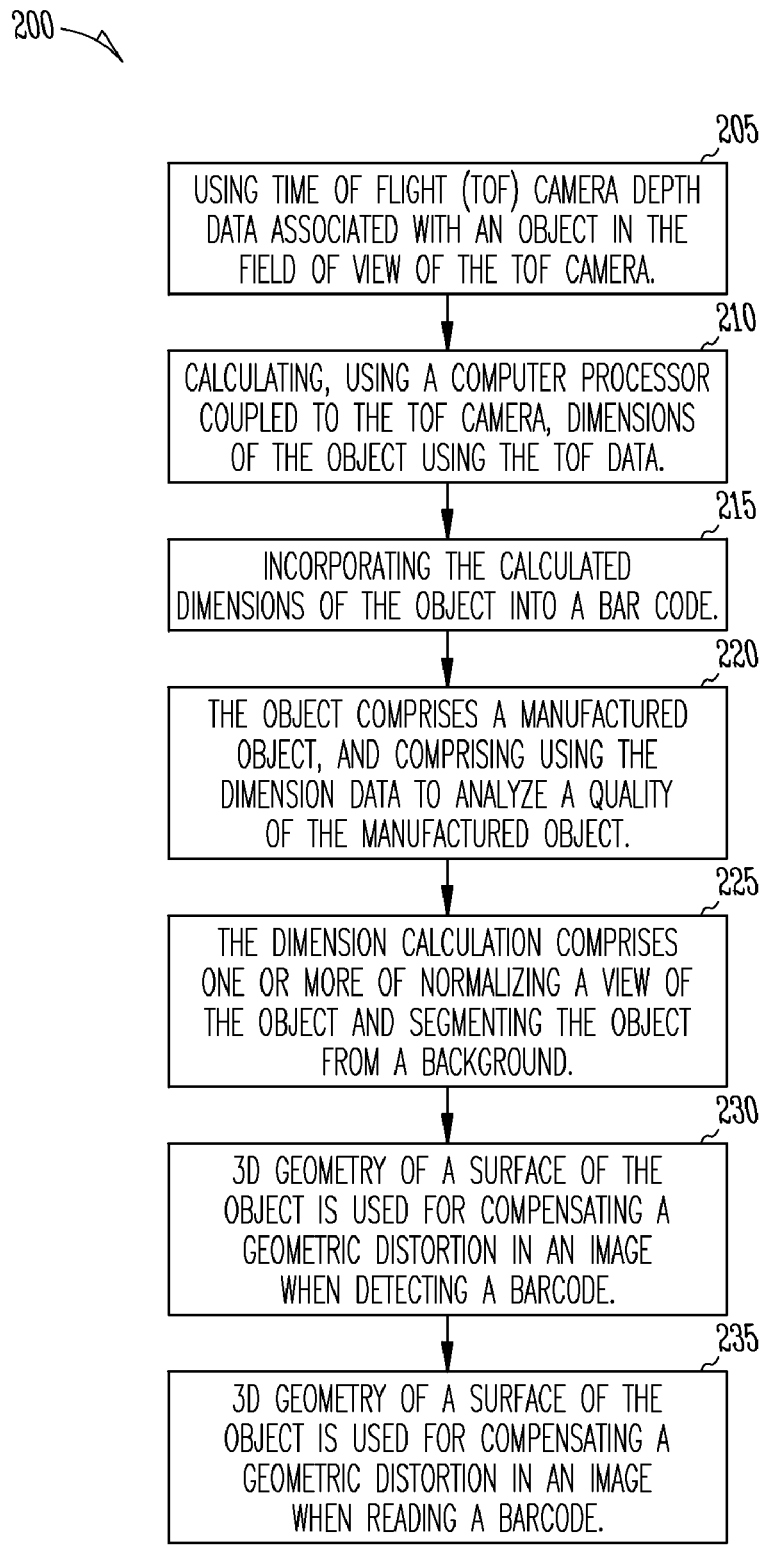
FIG. 2 is a flow chart of an example process for determining object metrology using a time of flight camera.
Figure 3:
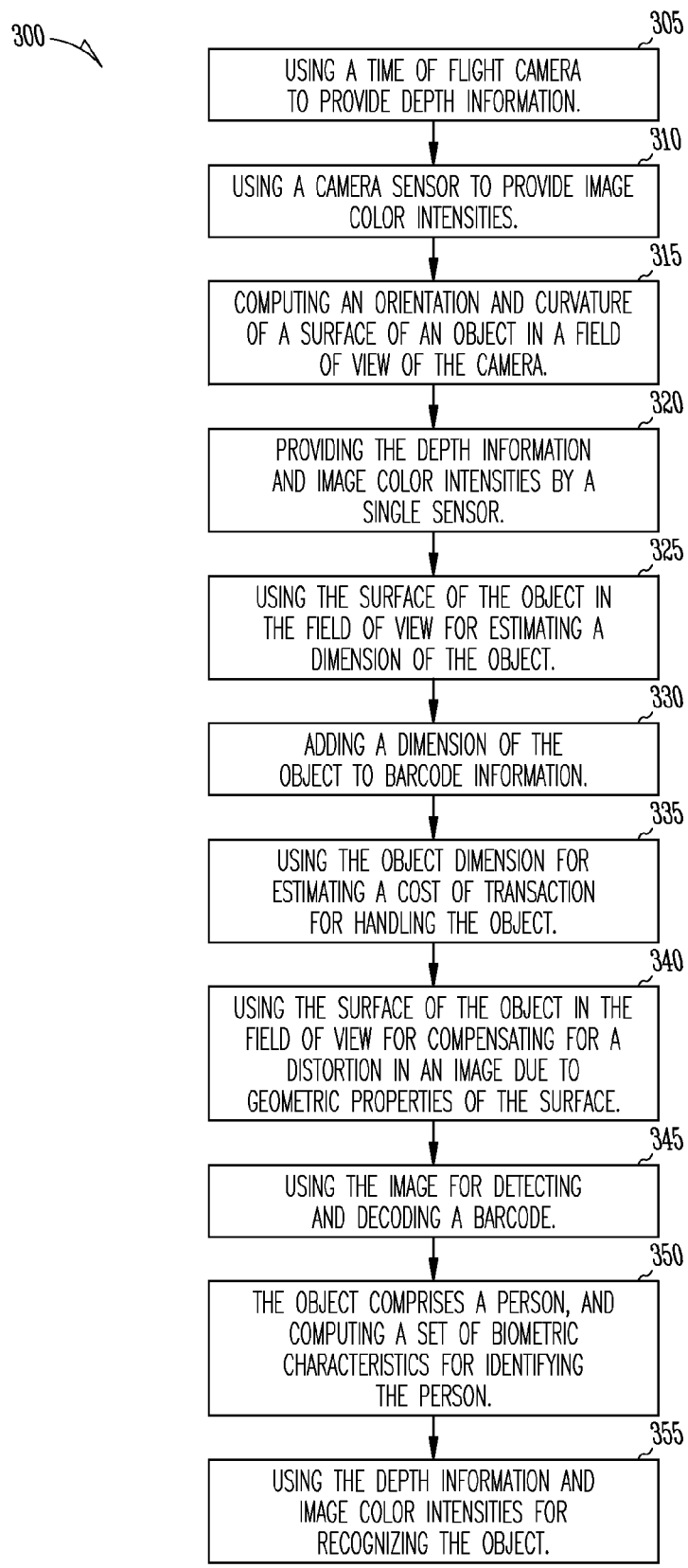
FIG. 3 is a flow chart of another example process for determining object metrology using a time of flight camera.

FIGS. 2 and 3 are flow charts of example processes 200 and 300 for determining object metrology using a time of flight camera. FIGS. 2 and 3 include a number of process blocks 205-235 and 305-355 respectively. Though arranged serially in the examples of FIGS. 2 and 3, other examples may reorder the blocks, omit one or more blocks, and/or execute two or more blocks in parallel using multiple processors or a single processor organized as two or more virtual machines or subprocessors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring specifically to the process 200 of FIG. 2, at 205, time of flight (TOF) camera depth data associated with an object in the field of view of the TOF camera is used, and at 210, a computer processor is used to calculate dimensions of the object using the TOF data. As noted above, the TOF data are generated by transmitting light pulses from the TOF camera to the object of interest. The light pulses are reflected off the object of interest, and sensed by a pixel array associated with the TOF camera.

At 215, the calculated dimensions of the object are incorporated into a bar code. At 220, the object comprises a manufactured object, and the dimension data is used to analyze a quality of the manufactured object. At 225, the dimension calculation comprises one or more of normalizing a view of the object and segmenting the object from a background. At 230, 3D geometry of a surface of the object is used for compensating a geometric distortion of an image when detecting a barcode, and at 235, 3D geometry of a surface of the object is used for compensating a geometric distortion in an image when reading a barcode.

Referring to the process 300 of FIG. 3, at 305, a time of flight (TOF) camera is used to provide depth information. At 310, a camera sensor is used to provide image color intensities. At 315, an orientation and curvature of a surface of an object in a field of view of the camera is computed.

At 320, the depth information and image color intensities are provided by a single sensor. At 325, the surface of the object in the field of view is used for estimating a dimension of the object. At 330, a dimension of the object is added to barcode information. At 335, the object dimension is used for estimating a cost of transaction for handling the object. At 340, the surface of the object in the field of view is used for compensating for a distortion in an image due to geometric properties of the surface. At 345, the image is used for detecting and decoding a barcode. At 350, the object comprises a person, and a set of biometric characteristics for identifying the person is computed. At 355, the depth information and image color intensities are used for recognizing the object.

Figure 4:
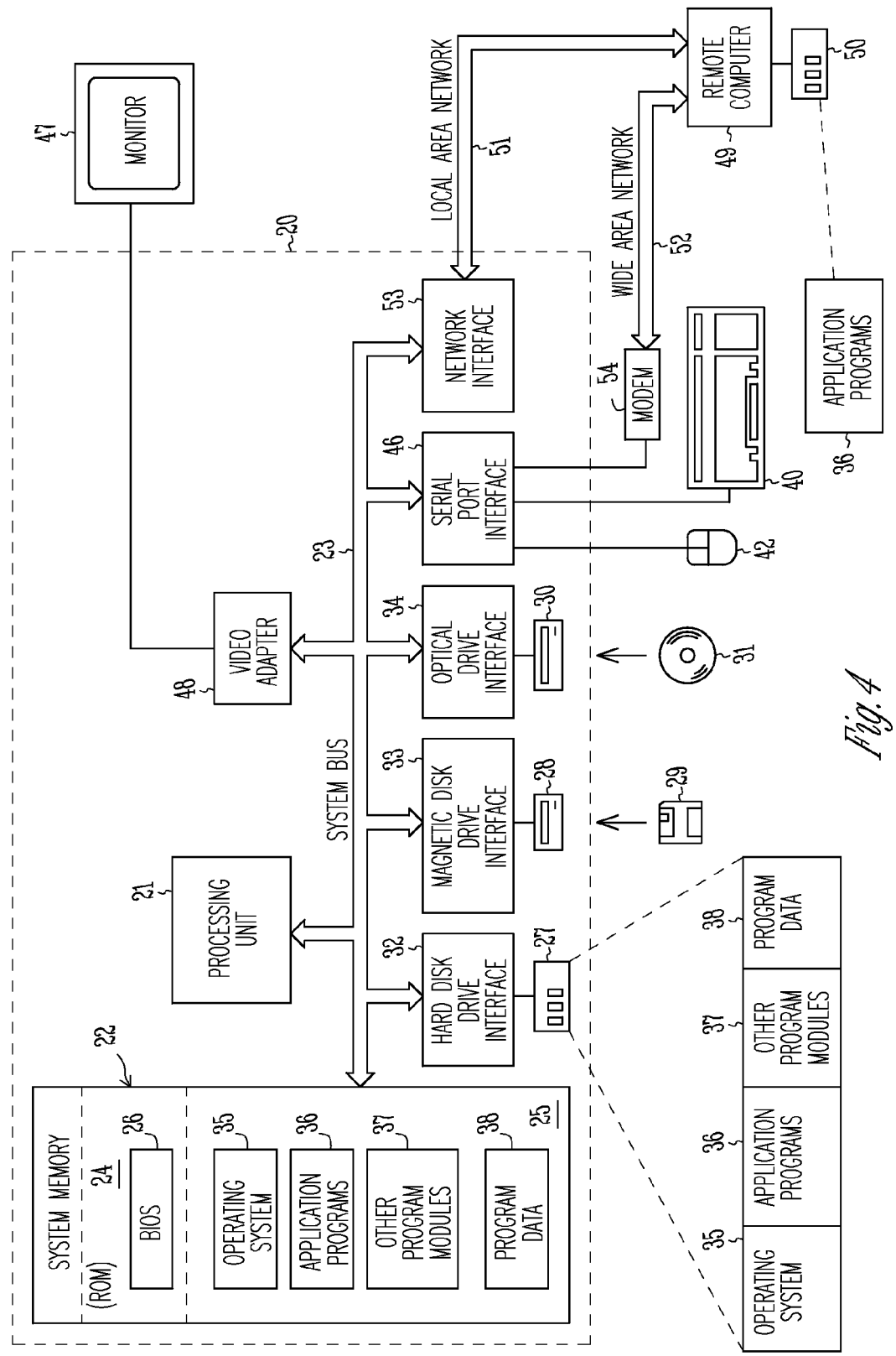
FIG. 4 is a block diagram of a computer processor and system in connection with which one or more embodiments of the present disclosure can operate.

FIG. 4 is an overview diagram of a hardware and operating environment in conjunction with which embodiments of the invention may be practiced. The description of FIG. 4 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 4, a hardware and operating environment is provided that is applicable to any of the servers and/or remote clients shown in the other Figures.

As shown in FIG. 4, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/0 relative to the computer 20, although only a memory storage device 50 has been illustrated. The logical connections depicted in FIG. 3 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Thus, an example system, method and machine readable medium for determining object metrology has been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)). Consequently, a machine-readable medium can be either tangible or intangible in nature.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A process comprising:
   using time of flight (TOF) camera depth data associated with an object in the field of view of the TOF camera;
   calculating, using a computer processor coupled to the TOF camera, dimensions of the object using the TOF data; and
   incorporating the calculated dimensions of the object into a bar code.

2. The process of claim 1, wherein the object comprises a manufactured object, and comprising using the dimension data to analyze a quality of the manufactured object.

3. The process of claim 1, wherein the dimension calculation comprises one or more of normalizing a view of the object and segmenting the object from a background.

4. The process of claim 1, wherein 3D geometry of a surface of the object is used for compensating a geometric distortion of an image when detecting a barcode.

5. The process of claim 1, wherein 3D geometry of a surface of the object is used for compensating a geometric distortion in an image when reading a barcode.

6. A process comprising:
   using a time of flight (TOF) camera to provide depth information;
   using a camera sensor to provide image color intensities;
   computing an orientation and curvature of a surface of an object in a field of view of the camera;
   using the surface of the object in the field of view for estimating a dimension of the object; and
   adding a dimension of the object to barcode information.

7. The process of claim 6, comprising providing the depth information and image color intensities by a single sensor.

8. The process of claim 6, comprising using the object dimension for estimating a cost of transaction for handling the object.

9. The process of claim 6, comprising using the surface of the object in the field of view for compensating for a distortion in an image due to geometric properties of the surface.

10. The process of claim 9, comprising using the image for detecting and decoding a barcode.

11. The process of claim 6, wherein the object comprises a person, and computing a set of biometric characteristics for identifying the person.

12. The process of claim 6, comprising using the depth information and image color intensities for recognizing the object.

13. A system comprising:
   a time of flight (TOF) device;
   a processor coupled to the TOF device; and
   a sensor;
   wherein the processor is configured to:
      receive TOF data from the sensor, the TOF data related to an object within range of the sensor;
      calculate dimensions of the object using the time of flight data;
      incorporate the calculated dimensions of the object into a bar code.

14. The system of claim 13, wherein the TOF device comprises a hand-held device.

15. The system of claim 13, wherein the TOF device comprises a TOF camera.

16. The system of claim 13, wherein the processor is configured to cause the TOF device to transmit a plurality of short light pulses.

17. The system of claim 13, wherein the TOF device is integrated with a hand-held scanner.

* * * * *